Oct. 14, 1924.                                               1,511,604
                        J. J. GANUCHEAU
                   SPECIFIC GRAVITY APPARATUS
                     Filed May 21, 1923        2 Sheets-Sheet 1
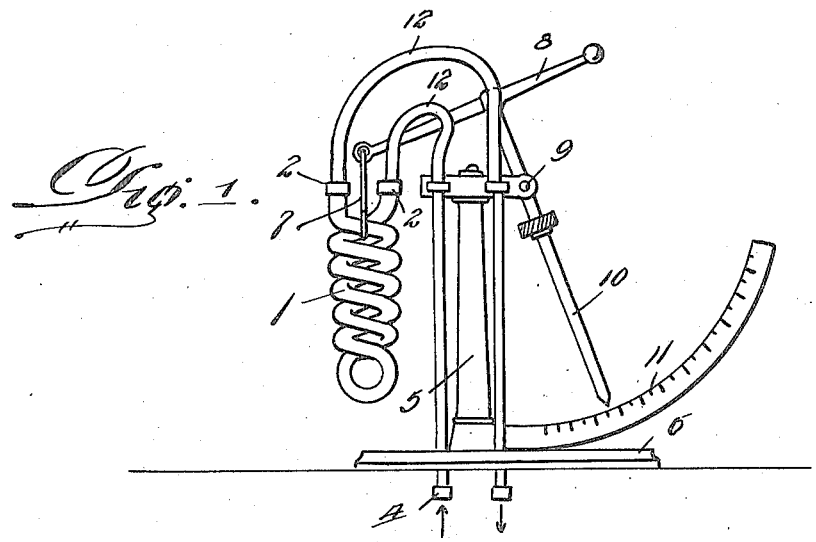
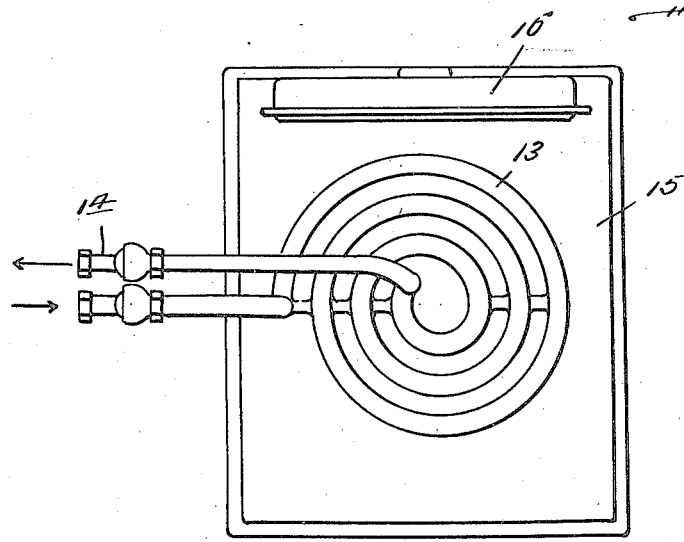

Oct. 14, 1924.                                              1,511,604
                    J. J. GANUCHEAU
              SPECIFIC GRAVITY APPARATUS
              Filed May 21, 1923      2 Sheets-Sheet 2
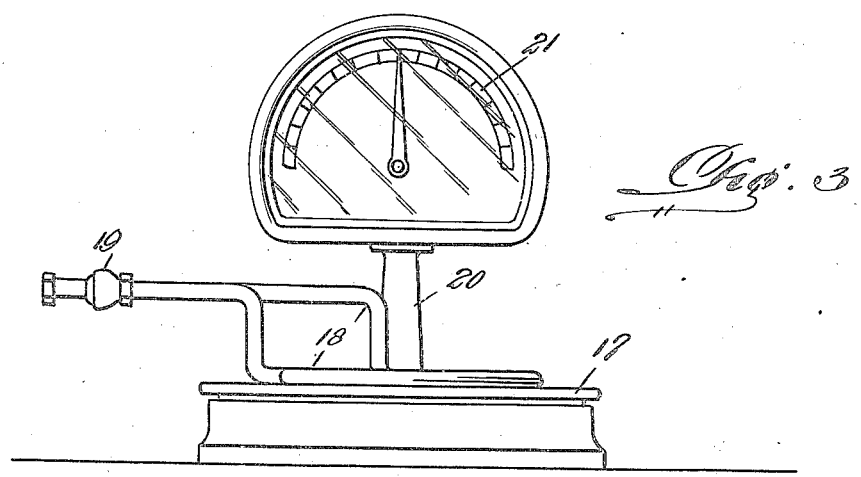
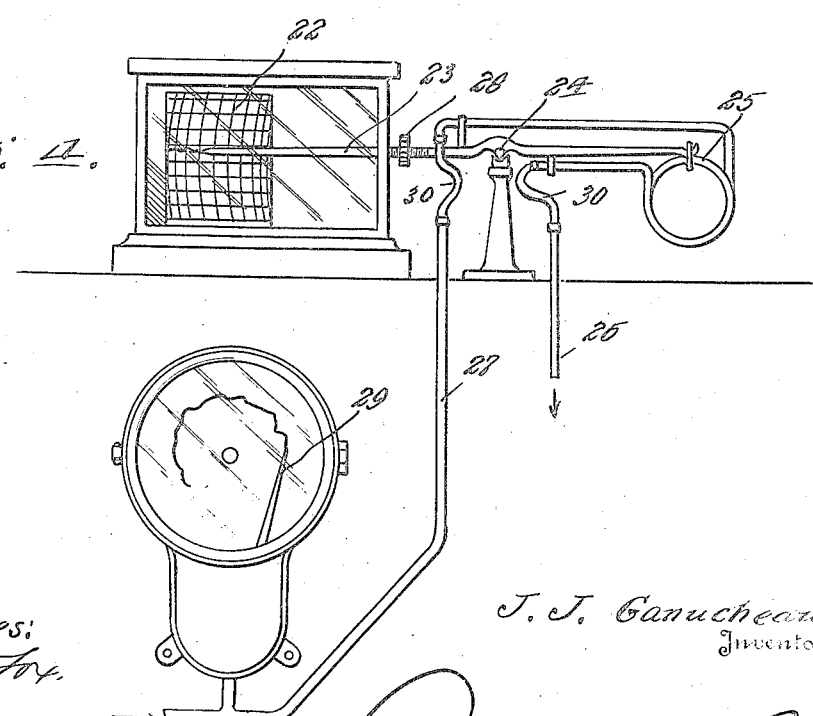

Patented Oct. 14, 1924.

1,511,604

UNITED STATES PATENT OFFICE.

JAMES J. GANUCHEAU, OF NEW ORLEANS, LOUISIANA.

SPECIFIC-GRAVITY APPARATUS.

Application filed May 21, 1923. Serial No. 640,389.

*To all whom it may concern:*

Be it known that I, JAMES J. GANUCHEAU, a citizen of the United States, residing at New Orleans, in the parish of Orleans and State of Louisiana, have invented certain new and useful Improvements in Specific-Gravity Apparatus, of which the following is a specification.

This invention has reference to specific gravity apparatus for recording variations in specific gravity of liquids capable of flowing through a pipe or tube whereby there is a change in weight of the coil of the pipe on the scale platform and the changes in weight will be recorded on a scale. The apparatus is attached to a bypass in the supply line or the total product may be passed through the coil of the apparatus.

The invention is capable of operating in different weights, as for instance, liquids or materials capable of going through a tube will enter an inlet and pass through a coil suspended at a point through flexible couplings so that any variation in weight of material passing through the coil will actuate the arm to indicate variations in the specific gravity on a graduated scale. Such a device shows at any instance the specific gravity of any liquid or material passing through the coil.

As a variation the liquids or materials capable of going through a tube may enter through an inlet and pass through a suspended coil through flexible couplings so that any variation and weight of material passing through the coil will actuate an indicating arm and record variations and specific gravity on a recording drum, thus making a permanent record of this specific gravity of materials continuously through the coil. As true specific gravity varies with temperature a recording thermometer is placed adjacent to the inlet and the temperature of materials as they pass through the coil is permanently recorded and corrections for true specific gravity made.

As a still further variance the principles of operation are the same as those first outlined but may be adapted to change quantities of material, such, for instance, as the total output of a factory.

The invention will be best understood from a consideration of the following detailed description taken in connection with the accompanying drawings forming part of this specification with the understanding, however, that the invention is not confined to any strict conformity with the showing in the drawings but may be changed and modified so long as such changes and modifications mark no material departure from the salient features of the invention as expressed in the appended claim.

In the drawings:

Figure 1 is an elevation of an apparatus through which the substance to be tested for specific gravity passes;

Figure 2 is a plan view of a different form of the apparatus than shown in Figure 1;

Figure 3 is an elevation of still another form of apparatus for the same purpose; and Figure 4 is an elevation of a recorder and temperature indicator adapted for a like purpose.

Referring to the drawings, there is shown in Figure 1 a coil 1 having terminal connections 2 at opposite ends and there suspended by a connection 12 to opposite couplings 4 supported by a post 5 and a base 6. The coil 1 is suspended by a link 7 to an arm 8 carried by a pivot support 9 carried by the column 5. The pivot 9 supports a pointer 10 movable over a scale 11 carried by the base 6.

As the liquid to be tested for specific gravity passes through the coil 1, its specific gravity acts upon the pointer 10 and is indicated on the scale 11, flexible connections 12 connecting the coil 1 with the inlet and outlet couplings 4.

In Figure 2 there is provided a pipe coil 13 with inlet and outlet couplings 14 connected to the coil 13 and the latter is supported upon a weighing platform 15 arranged to show upon a scale dial 16 a specific gravity indication of the liquid flowing through the coil 13.

In Figure 3 there is provided a platform scale 17 carrying upon the platform a coil 18 connected by flexible ball connections 19 to a supply of liquid to be tested and the scales are provided with a post 20 having a visible scale 21 by means of which the specific gravity is indicated.

In Figure 4 there is shown a recorder 22 graduated to indicate specific gravity and having an arm 23 carried by pivot points 24 and suspending a coil 25 through which the material being recorded is passed, the liquid being treated flowing through pipes 26 and 27 from a supply of liquid, an adjustable weight 28 being arranged upon the arm 23 to provide for calibration of the instrument. Flexible couplings 30 provide for compensation of the parts to permit the movement of the recording arm 23 as necessary.

The apparatus herein described constitutes a continuous specific gravity apparatus having the possibilities of determining specific gravity of light or heavy liquids, magmas and homogeneous mixtures of any substance capable of passing through a pipe or tube. With the apparatus described the exact specific gravity is shown at all times whether it be in small quantities for test purposes or a total plant production, it being only necessary to furnish an apparatus of different sizes to answer the specific requirements.

To determine the specific gravities of magmas or homogeneous mixtures it is necessary to fill and weigh a container for each specific gravity desired, the operations necessary to secure the desired specific gravity with mixtures would be like that explained in handling liquids. In a homogeneous mixture beaten with air the specific gravity varies with the amount of air present as supplied by a valve which is opened and closed according to the consistency required. This requires a separate test for each amount of air applied to the mixture. With this apparatus it is only necessary to determine the gravity desired and the apparatus will continuously show any variations above or below that desired.

The principle on which this apparatus works is that the volume in the pipe or tube is constant at constant temperatures so that different gravity substance going through the pipe will change the weight in the coil pipe on the scale platform. The coil pipe or tube on the scale platform is connected to the supply line by flexible couplings or connections so that any difference in weight will be recorded on the scales. This apparatus would be attached to a bypass in the supply line or the total product may pass through the coil of the apparatus.

Another feature of this apparatus is the elimination of evaporation of light volatile liquids or mixtures of light and heavy liquids, the more volatile liquids evaporating when the present method of determining specific gravity is used.

What is claimed is:

Apparatus for determining the specific gravity of liquid comprising a stand having an arcuate scale attached thereto, a pointer pivoted upon the stand and having an end portion adapted to move along the scale, a cross bar fixed to the pointer at a point above the point of pivotal connection with the stand, a coil hanging pendant from one end of the cross bar and disposed at the opposite side of the stand from the pointer, and means supported by the stand for passing a liquid through the coil.

In testimony whereof I affix my signature.

JAMES J. GANUCHEAU.